(12) United States Patent
Crayssac et al.

(10) Patent No.: US 10,393,293 B2
(45) Date of Patent: Aug. 27, 2019

(54) COUPLING TO BE CRIMPED ONTO AT LEAST ONE PIPE, SET OF PIPES INCLUDING SUCH A COUPLING, AND METHOD FOR ASSEMBLING A PIPE WITH SUCH A COUPLING

(71) Applicant: L'Air Liquide, Société Anonyme pour l'Etude et l'Exploitation des Procédés Georges Claude, Paris (FR)

(72) Inventors: Frédéric Crayssac, Velizy (FR); Bernard Lafleur, Saint Médard en Forez (FR); Marc Wagner, Les Loges-en-Josas (FR)

(73) Assignee: L'Air Liquide Societe Anonyme Pour L'Etude Et L'Exploitation Des Procedes Georges Claude, Paris (FR)

( * ) Notice: Subject to any disclaimer, the term of this patent is extended or adjusted under 35 U.S.C. 154(b) by 136 days.

(21) Appl. No.: 15/517,462

(22) PCT Filed: Oct. 1, 2015

(86) PCT No.: PCT/FR2015/052630
§ 371 (c)(1),
(2) Date: Apr. 6, 2017

(87) PCT Pub. No.: WO2016/055720
PCT Pub. Date: Apr. 14, 2016

(65) Prior Publication Data
US 2017/0248256 A1   Aug. 31, 2017

(30) Foreign Application Priority Data

Oct. 8, 2014  (FR) ..................................... 14 59626

(51) Int. Cl.
*F16L 13/14* (2006.01)
*F16L 13/007* (2006.01)
*F25J 3/04* (2006.01)
*F16L 55/04* (2006.01)

(52) U.S. Cl.
CPC ........... *F16L 13/146* (2013.01); *F16L 13/007* (2013.01); *F16L 13/141* (2013.01);
(Continued)

(58) Field of Classification Search
CPC .. F16L 13/146; F16L 13/165; F16L 2013/145
(Continued)

(56) References Cited

U.S. PATENT DOCUMENTS 2,082,164 A * 6/1937 Karrer ..................... F16L 19/00
138/32
2,323,099 A * 6/1943 Patten ..................... F16L 19/00
285/14
(Continued)

FOREIGN PATENT DOCUMENTS

DE        3815492 A1   11/1989
DE   102008039446 A1    1/2010
EP        1195550 A2    4/2002

*Primary Examiner* — Aaron M Dunwoody
(74) *Attorney, Agent, or Firm* — Justin K. Murray

(57) ABSTRACT

The invention relates to a coupling which includes at least: a tubular coupling member suitable for receiving a pipe and comprising one or more annular ribs, and a crimping ring arranged on the coupling member and translatably movable between a position for inserting the pipe into the coupling member, and a crimping position, in which the crimping ring immobilizes the pipe relative to the coupling member after the deformation of the one or more ribs. Recesses are formed between the coupling member and the pipe in the crimping position. The coupling has at least one exhaust opening arranged such as to provide fluid communication between said at least one recess and the outside of the coupling.

13 Claims, 2 Drawing Sheets

(52) U.S. Cl.
CPC ........... *F25J 3/04866* (2013.01); *F16L 55/04* (2013.01); *F25J 2290/44* (2013.01); *F25J 2290/60* (2013.01)

(58) Field of Classification Search
USPC .................. 285/13, 14, 382, 382.1, 382.2
See application file for complete search history.

(56) References Cited

U.S. PATENT DOCUMENTS

| | | | | |
|---|---|---|---|---|
| 2,453,391 | A * | 11/1948 | Whittingham | F16L 19/06 285/14 |
| 2,967,068 | A * | 1/1961 | Gressel | F16L 19/0206 285/14 |
| 3,584,900 | A * | 6/1971 | Lennon | F16L 19/103 285/14 |
| 3,893,720 | A * | 7/1975 | Moebius | F16L 13/146 285/187 |
| 4,061,367 | A * | 12/1977 | Moebius | F16L 13/146 285/382.2 |
| 6,131,964 | A * | 10/2000 | Sareshwala | F16L 13/146 285/382 |
| 8,925,978 | B2 * | 1/2015 | Jamison | F16L 17/02 285/382 |
| 2006/0284415 | A1 * | 12/2006 | McKay | A61M 39/1011 285/256 |
| 2011/0109084 | A1 * | 5/2011 | Bonhag | F16L 13/146 285/417 |
| 2011/0163536 | A1 * | 7/2011 | Sindelar | F16L 13/146 285/309 |
| 2018/0051834 | A1 * | 2/2018 | Hofmann | B21D 39/046 |

* cited by examiner

COUPLING TO BE CRIMPED ONTO AT LEAST ONE PIPE, SET OF PIPES INCLUDING SUCH A COUPLING, AND METHOD FOR ASSEMBLING A PIPE WITH SUCH A COUPLING

The present invention relates to a coupling intended to be coupled fluidically to at least one pipe. In addition, the present invention relates to a set of pipes comprising such a coupling. Moreover, the present invention relates to a method of assembling at least one pipe to one such coupling.

The present invention notably applies to the installation of cryogenic air separation units intended to produce oxygen, nitrogen and/or argon.

A cryogenic air separation unit is generally delivered in the form of several subassemblies which have been prefabricated at a manufacturing site and have then to be assembled with one another on the cryogenic air separation unit installation and production site.

In order to assemble these subassemblies, it is notably necessary to couple tens of pipes to one another. To couple these pipes, it is possible to insert splicing sleeves into the pipes and then to secure these splicing sleeves to the pipes using welding. However, all of these welded couplings are difficult and therefore require qualified operators to perform quality welding and other operators to inspect these welds. Performing and inspecting these couplings sometimes extends over several months.

As an alternative to welded couplings it is also known practice to couple pipes together using crimped couplings in fields in which the gases or liquids undergo relatively small variations in temperature and in pressure.

A crimpled coupling of the prior art generally comprises two tubular coupling members and two crimping rings arranged respectively on each coupling member. Each coupling member has annular ribs on its internal surface intended to accept the pipe. Each crimping ring can be moved translationally with respect to a respective coupling member.

During an assembly method of the prior art, each pipe that is to be coupled is introduced into a respective coupling member, then a tool moves the crimping ring between a position of introduction of the pipe into the coupling member and a crimping position in which the crimping ring crimps the pipe onto the coupling member. Crimping radially deforms the annular ribs and, in general, the pipe, so that each annular rib is able to seal the coupling to each coupled pipe.

However, during the radial deformation of the annular ribs, cavities are formed between the coupling member form and the crimping ring in the crimping position. Now, each of these cavities forms an enclosed space which carries the risk of giving rise to safety problems. Specifically, in use, as cryogenic fluids flow, a leak at a very low flow rate may occur from inside the coupling, so that the cryogenic fluid very slowly fills the cavities. Then, as the temperature of the cryogenic fluid increases, for example when the cryogenic fluid stops flowing along the pipe, the pressure of the cryogenic fluid present in the cavities risks increasing very sharply. This very sharp increase in pressure carries the risk of causing the contact pressures initially exerted by the crimping at ambient temperature to vary. As a result, this very sharp increase in pressure carries the risk of causing a loss of sealing, a loss of mechanical integrity, deterioration of the coupling or even violent rupturing of the coupling.

EP-A-1195550 describes a coupling in which texturizing has the effect of holding the tube on the coupling. The textures are created on the surface of the rib and over the entire periphery thereof. The textures, because of their small dimensions, become crushed and embedded in the tube, upon crimping. Thus, there is no longer any communication opening, even on a micrometric scale.

The present invention notably seeks to resolve, in full or in part, the problems mentioned hereinabove.

To this end, one subject of the invention is a coupling, intended to be fluidically coupled to at least one pipe, for example in a cryogenic air separation unit, the coupling comprising:

at least one coupling member having a tubular overall shape and offering a receptacle to accept the pipe, the said coupling member comprising at least one rib of annular overall shape, and at least one crimping ring arranged on said at least one coupling member in such a way as to be moved between an introduction position, in which the pipe can be introduced into said at least one receptacle, and a crimping position, in which the crimping ring immobilizes the pipe with respect to a respective coupling member following deformation of said at least one rib, the coupling being characterized in that it has at least one exhaust orifice arranged in such a way as to fluidically connect said at least one cavity to the outside of the coupling and in that the at least one cavity is formed between the coupling member and the pipe in the crimping position following deformation of said at least one rib.

Thus, the or each exhaust orifice makes it possible to maintain the integrity of the coupling crimped to the coupled pipe(s). Specifically, the or each exhaust orifice forms a passage that allows fluids, gas or liquid, to flow from the cavity to the outside of the coupling. Now, the outside of the coupling is at a pressure very much lower than the pressures that a cryogenic fluid may generate. In general, the outside of the coupling is at atmospheric pressure, which means that the or each exhaust orifice allows the cavity to be connected to the atmosphere.

In the present application, the verbs "to couple", "to connect", "to supply" and derivatives thereof relate to the placing in fluidic communication of at least two mutually distant volumes so as to allow fluid to flow between these two distant volumes. This flow of fluid may be via no, one, or several component(s), namely may be direct or indirect.

In the present application, the term "pipe" denotes any fluidtight conduit designed for the flow of a fluid used in a cryogenic installation. For example, the term pipe covers a rigid tube or a flexible pipe.

According to one embodiment of the invention, said at least one exhaust orifice is formed by holes which coincide and which pass respectively through said at least one coupling member and said at least one crimping ring between said at least one cavity and an external surface of said at least one crimping ring.

Thus, such a hole allows fluid to flow from the cavity and over a distance that is limited to the thickness of the crimping ring, thereby reducing the pressure drops experienced by this flow, and therefore allows the rate at which the fluid is exhausted to be relatively high.

According to one embodiment of the invention, said at least one hole has a rectilinear shape, said holes are rectilinear, said holes extending preferably perpendicular to the direction of flow of a fluid in the corresponding coupling member.

Thus, such a hole is relatively simple to manufacture, for example by drilling.

According to one embodiment of the invention, several cavities are formed between the coupling member and the pipe in the crimping position, the coupling having several exhaust orifices arranged in such a way as to respectively fluidically connect at least one of the cavities to the outside of the coupling.

Thus, the exhaust orifices allow the cavities to be connected to the atmosphere.

According to an alternative form of the invention, the coupling has several holes arranged at various places in the direction of flow of a fluid in the corresponding coupling member. Thus, these holes guarantee that the or each cavity will communicate fluidically with at least one respective hole, even if the manufacturing tolerances on the crimping ring and on the coupling member are large.

According to one embodiment of the invention, at least one exhaust orifice is formed by at least one groove arranged in such a way as to open on the one hand into a respective cavity and on the other hand onto the side of the rib which is the opposite side to the respective cavity.

The or each groove may extend perpendicular to one or several ribs.

In other words, the groove passes right across the respective rib in the overall direction of flow of a fluid in the corresponding coupling member. Thus, such a rib allows the cavity to be connected to the atmosphere.

According to one alternative form of the invention, the respective groove may be parallel to the direction of flow of a fluid in the corresponding coupling member. According to another alternative form of the invention, the respective groove may be non-parallel to the direction of flow of a fluid in the corresponding coupling member. For example, the groove may have a component orthogonal to the direction of flow of a fluid in the corresponding coupling member, in addition to an "axial" component parallel to the direction of flow of a fluid in the coupling member; such a rib may for example be helicoidal.

According to one embodiment of the invention, the coupling has at least two grooves, the grooves being distributed around the corresponding coupling member, preferably uniformly distributed.

Thus, several grooves make it possible to ensure that the or each cavity will indeed be connected to the outside of the coupling and therefore to the atmosphere. For example, the coupling may have three grooves uniformly distributed about the coupling member and therefore each pair defining intervals of around 120 degrees between them.

According to one embodiment of the invention, the or each coupling member comprises at least two ribs, several cavities being formed near respective ribs, each groove being arranged in such a way as to open on the one hand into a respective cavity and on the other hand onto the side of the respective rib which is the opposite side to the respective cavity, so that the grooves allow fluid to be channeled from at least one cavity referred to as an upstream cavity, which is the one closest to the inside of the coupling and a cavity referred to as a downstream cavity, which is the one closest to the outside of the coupling.

Thus, several ribs make it possible to maximize the sealing of the coupling, and this allows the coupling to withstand high pressures. In this case, the grooves connect the cavities to one another and to the atmosphere in a series configuration.

According to one embodiment of the invention, at least one exhaust orifice has a delivery cross section of between 1 mm$^2$ and 10 mm$^2$.

Thus, such a delivery cross section makes it possible to minimize the pressure drops generated by the exhaust orifice, thereby increasing the rate at which the fluid is exhausted and therefore limiting the maximum pressure that the or each cavity can attain.

According to one embodiment of the invention, the receptacle has the overall shape of a cylinder with a circular base.

Thus, the receptacle can accept a cylindrical pipe.

In practice, the or each coupling member may have an inside diameter of between 4 mm, namely ¼ of an inch, and 161 mm, namely 6 inches.

According to an alternative form of the invention, the or each coupling member and the or each crimping ring are configured in such a way as to seal the or each pipe against gases at a pressure of below 100 bar·a, the gases being for example nitrogen, oxygen, argon or a mixture of these gases.

According to an alternative form of the invention, the or each coupling member and the or each crimping ring are configured in such a way as to seal the or each pipe against liquids at a pressure of below 100 bar·a, the liquids being for example nitrogen, oxygen, argon or a mixture of these gases.

According to one embodiment of the invention, the coupling further comprises at least one stop member arranged in such a way as to stop a respective crimping ring in the crimping position.

Thus, such a stop member allows the pipe to be positioned accurately on the coupling with a view to crimping.

According to an alternative form of the invention, the coupling members, the intermediate body and the crimping rings are configured in such a way as to seal against gases and against liquids with a maximum leakage rate of $10^{-3}$ mbar·L/s (millibar·liters/second). In practice, only the rib closest to the stop member is truly fluidtight. The other ribs are not absolutely fluidtight because they are traversed or drained by the exhaust orifices. Therefore, very small quantities of cryogenic fluids may escape to the atmosphere, but this has no negative impact on a cryogenic installation.

According to one embodiment of the invention, the coupling comprises two coupling members and two crimping rings, the coupling further comprising an intermediate body securing the coupling members together.

Thus, such a coupling member makes it possible to create a set of pipes comprising at least two pipes, for example to equip a cryogenic air separation unit.

As an alternative to the preceding embodiment, the coupling may comprise a single coupling member which is designed to accept a pipe, the coupling moreover being configured in such a way as to be fixed to a fluidic component other than a pipe, such as a collector unit or a manifold unit. In this alternative, just one pipe is coupled and crimped to the coupling. Thus, the coupling allows this single pipe to be coupled in a fluidtight manner to the fluidic component.

According to another alternative form, the coupling may comprise more than two coupling members, for example three or four, designed to accept as many pipes. Thus, the coupling may form a tee or a cross.

According to another alternative form, at least one coupling member has a tubular and rectilinear overall shape. In other words, the coupling member is formed of a cylinder of rectilinear axis. In this alternative form, the movement of each crimping ring for the purposes of crimping is a rectilinear translational movement.

As an alternative, at least one coupling member has a tubular and curved overall shape. In other words, the coupling member is formed of a cylinder the axis of which is curved. Thus, the coupling may form a curved elbow, for example a 90 degree elbow. In this alternative form, the movement of each crimping ring for the purposes of crimping is a curved translational movement.

Moreover, another subject of the present invention is a set of pipes, for example for a cryogenic air separation unit, comprising at least two pipes, said set of pipes being characterized in that it further comprises a coupling according to the invention, said coupling being coupled to said at least two pipes.

Thus, such a set of pipes avoids the need to resort to welding for assembling two or more pipes, this for example making it possible to assemble a cryogenic air separation unit more quickly and more simply than with a set of pipes according to the prior art. In addition, such a set of pipes allows each cavity to be connected to the atmosphere.

According to one embodiment of the invention, the coupling is made of material(s) selected from the group consisting of carbon steel, stainless steel and aluminum alloy, and in which said at least two pipes are made of materials selected from the group consisting of carbon steel, stainless steel and aluminum alloy, it being possible for the materials to be different.

Thus, such materials are compatible with the mechanical and chemical demands placed on a cryogenic air separation unit.

In addition, another subject of the present invention is method of assembling at least one pipe with a coupling according to the invention, for example for a cryogenic air separation unit, comprising the steps:

of introducing said at least one pipe into said at least one coupling member, and of moving said at least one crimping ring from the introduction position to the crimping position so as to couple the coupling to said at least one pipe so that said at least one exhaust orifice fluidically connects said at least one cavity to the outside of the coupling.

Thus, such a method of assembly avoids the need to resort to welding to assemble two pipes or more, this for example making it possible to assemble a cryogenic air separation unit more quickly and more simply than with a set of pipes according to the prior art.

The embodiments and alternative forms mentioned hereinabove can be considered in isolation or in any technically permissible combination.

The present invention will be clearly understood and its advantages will also become evident in the light of the description which will follow, given solely by way of nonlimiting example and made with reference to the attached drawings, in which.

Figure 1:
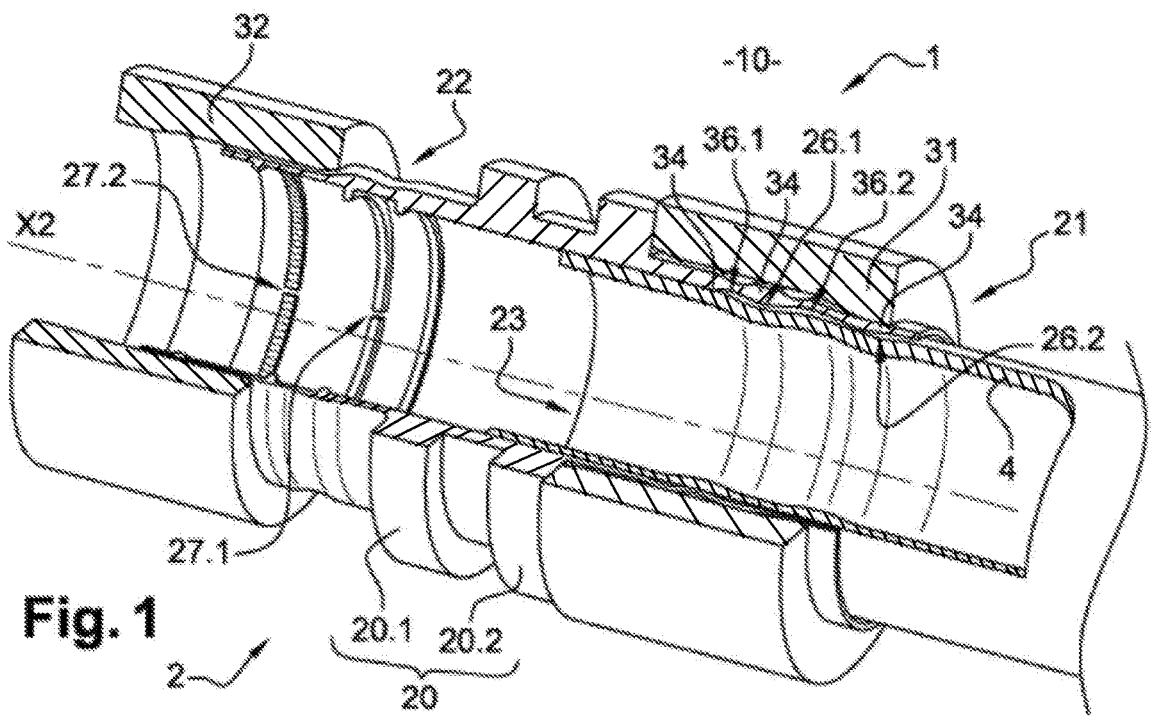
FIG. 1 is a schematic perspective view, sectioned by two perpendicular planes, of part of a set of pipes according to a first embodiment of the invention and comprising a coupling according to a first embodiment.

FIG. 1 illustrates a set of pipes 1 comprising a coupling 2 and two pipes 4 and 5. The pipe 4 is partially visible in FIG. 1 and the pipe 5 is partially visible in FIGS. 4, 5 and 6. The set of pipes 1 is intended to equip a cryogenic air separation unit.

The coupling 2 comprises two coupling members 21 and 22 and two crimping rings 31 and 32 which are arranged respectively on the coupling member 21 and on the coupling member 22, so as to be moved respectively with respect to the coupling member 21 or 22.

In the example of FIG. 1, the crimping rings 31 and 32 are moved parallel to an axial direction X2. The axial direction X2 corresponds to the axis of the pipe 4 or 5 when the set of pipes 1 is in the assembled state. The axial direction X2 corresponds to the direction of flow of a fluid in the coupling member 21 or 22 when the set of pipes 1 is in service.

The coupling 2 further comprises an intermediate body 20 which is arranged between the coupling members 21 and 22 and which has an annular overall shape. The intermediate body 20 secures the coupling members 21 and 22 together. The coupling members 21 and 22 here are arranged symmetrically with respect to the intermediate body 20. Likewise, the crimping rings 31 and 32 here are arranged symmetrically with respect to the intermediate body 20.

In addition, the coupling 2 comprises two stop members 20.1 and 20.2 which are designed to respectively stop the crimping rings 31 and 32 in the crimping position. In this particular instance, the stop members 20.1 and 20.2 are formed by axial annular surfaces formed on the intermediate body 20.

In the example of FIG. 1, the coupling member 21 is identical to the coupling member 22 and the crimping ring 31 is identical to the crimping ring 32. As a result, only the coupling member 21 and the crimping ring 31 are described in detail hereinafter. The description of the coupling member 21 and of the crimping ring 31 can be read across respectively to the coupling member 22 and to the crimping ring 32.

As FIG. 1 shows, the coupling member 21 has a tubular overall shape and offers a receptacle 23 to accept the pipe 4. The receptacle 23 here is a surface that is radially internal with respect to the axial direction X2. The receptacle 23 has the overall shape of a cylinder with a circular base, which in this instance is generated about the axial direction X2. In the example of FIG. 1, the coupling member 21 has a receptacle 23 the inside diameter of which is around 60 mm.

Moreover, the coupling member 21 comprises three ribs 34 of annular overall shape around the axial direction X2. In the example of FIG. 1, the ribs 34 are arranged on a surface of the coupling member 21 which surface is radially internal with respect to the axial direction X2.

The crimping ring 31 can be moved at least translationally with respect to the coupling member 21 and parallel to the axial direction X2, between:

an introduction position (not depicted) in which the pipe 4 can be introduced into the coupling member 21; and a crimping position, in which the crimping ring 32 immobilizes the pipe 4 with respect to the coupling member 21 following deformation of the ribs 34 and of the pipe 4.

The crimping ring 32 itself is depicted in the introduction position and not in the crimping position, because the coupling member 22 has not yet received a pipe.

Two cavities 36.1 and 36.2 are formed between the coupling member 21 and the pipe 4 in the crimping position (FIG. 1). The cavities 36.1 and 36.2 have, in section in the plane of FIG. 1, an oblong shape which extends parallel to the axial direction X2. The cavities 36.1 and 36.2 are formed respectively near the ribs 34. Because the ribs 34 are of annular overall shape, the cavities 36.1 and 36.2 are also of annular overall shape these shapes being generated about the axial direction X2 and based on the oblong section.

In addition, the coupling 2 has several exhaust orifices which are arranged in such a way as to fluidically connect the cavities 36.1 and 36.2 to the outside 10 of the coupling 2. In the example of FIG. 1, the exhaust orifices are formed by grooves, two of which are visible in FIG. 1 with the references 26.1 and 26.2.

The groove 26.1 is arranged in such a way as to open on the one hand into the cavity 36.1 and on the other hand onto the side of the rib 34 which is the opposite side to the cavity 36.1. Similarly, the groove 26.2 is arranged in such a way as to open on the one hand into the cavity 36.2 and on the other hand onto the side of the rib 34 which is the opposite side to the cavity 36.2. Each groove 26.1 or 26.2 here has a delivery cross section of around 3 mm$^2$.

In other words, the grooves 26.1 and 26.2 pass respectively right across two ribs 34 in the axial direction X2. Each groove 26.1 or 26.2 here is parallel to the axial direction X2. Each groove 26.1 or 26.2 allows fluid to be channeled from the upstream cavity 36.1, which is the one closest to the inside of the coupling 2 and the downstream cavity 36.2, which is the one closest to the outside 10 of the coupling 2. In other words, the upstream cavity 36.1 and the downstream cavity 36.2 are fluidically connected in series by the grooves 26.1 and 26.2.

The coupling 2 has grooves 27.1 and 27.2 which here are distributed uniformly about the coupling member 22 and about the axial direction X2. These grooves 27.1 and 27.2 are respectively similar to the grooves 26.1 and 26.2.

The coupling members 21 and 22, the intermediate body 20, the pipe and the crimping rings 31 and 32 are configured in such a way as to seal against gases and against liquids with a maximum leakage rate of 10$^{-3}$ mbar·L/s (millibars·liters/second). In practice, only the rib 34 closest to the stop member 20.1, in the case of the coupling member 21, is truly fluidtight. The other ribs 34 are not absolutely fluidtight because they are traversed by the grooves 26.1 and 26.2. Therefore very small quantities of cryogenic fluid may escape to the atmosphere, and this has no negative impact on a cryogenic installation.

In service, each exhaust orifice formed by a groove 26.1 or 26.2 defines a passage that allows fluids to flow from a respective cavity 34 toward the outside 10 of the coupling 2 which is at atmospheric pressure. In other words, the grooves 26.1 or 26.2 allow the cavities 34 to be connected to the atmosphere.

Likewise, the grooves 27.1 and 27.2 allow the corresponding cavities to be connected to the atmosphere.

Figure 2:
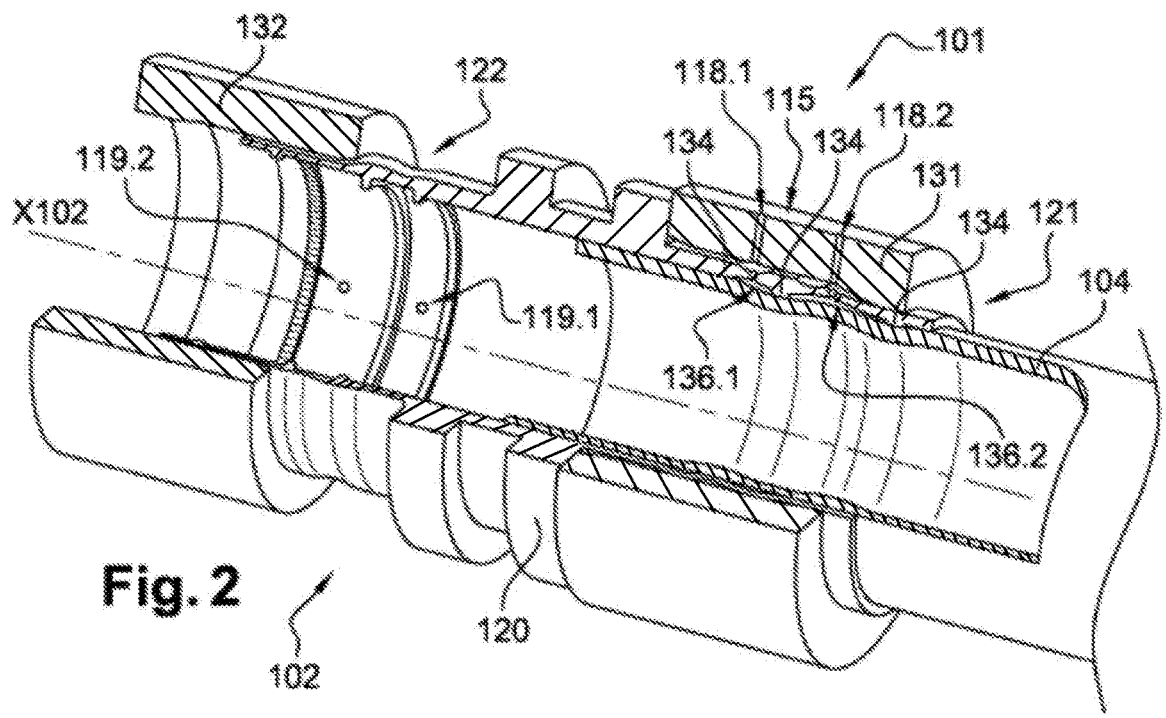
FIG. 2 is a view similar to FIG. 1, illustrating part of a set of pipes according to a second embodiment of the invention and comprising a coupling according to a second embodiment.

FIG. 2 illustrates a set of pipes 101 and a coupling 102 which are in accordance with a second embodiment of the invention. Insofar as the set of pipes 101 and the coupling 102 are respectively similar to the set of pipes 1 and to the coupling 2, the description of the set of pipes 1 and of the coupling 2 given hereinabove in relation to FIG. 1 can be read across to the set of pipes 101 and to the coupling 102, with the exception of the notable differences listed hereinafter.

A component of the set of pipes 101 or of the coupling 102 that is identical or corresponds, in terms of its structure or in terms of its function, to a component of the set of pipes 1 or of the coupling 2 bears the same numerical reference increased by 100. Thus, there is an axial direction X102, a pipe 104, an intermediate body 120, two coupling members 121 and 122, two crimping rings 131 and 132, three ribs 134 and cavities 136.1 and 136.2.

The coupling 102 differs from the coupling 2 because, in place of the grooves 26.1 and 26.2, the exhaust orifices are formed by several holes 118.1 and 118.2 and equivalent, not depicted, which coincide and which respectively pass through the coupling member 121 or 122 and the crimping ring 131 or 132 between each cavity 134 and an external surface 115 of the crimping ring 131 or 132. The holes 118.1 and 118.2 allow the cavities 134 respectively to be connected to the atmosphere.

The coupling 102 also has holes 119.1 and 119.2 and equivalent, which in this instance are distributed uniformly about the coupling member 121 and about the axial direction X102. These holes 119.1 and 119.2 and equivalent are respectively similar to the holes 118.1 and 118.2. The holes 119.1 and 119.2 allow corresponding cavities to be connected to the atmosphere.

Each hole 118.1 or 118.2 or equivalent here is of rectilinear shape and extends perpendicular to the axial direction X102. In other words, each hole 118.1 or 118.2 or equivalent extends in a radial direction.

According to an alternative form of the invention that has not been depicted, the coupling may have several holes arranged at different places along the axial direction.

Figure 3:
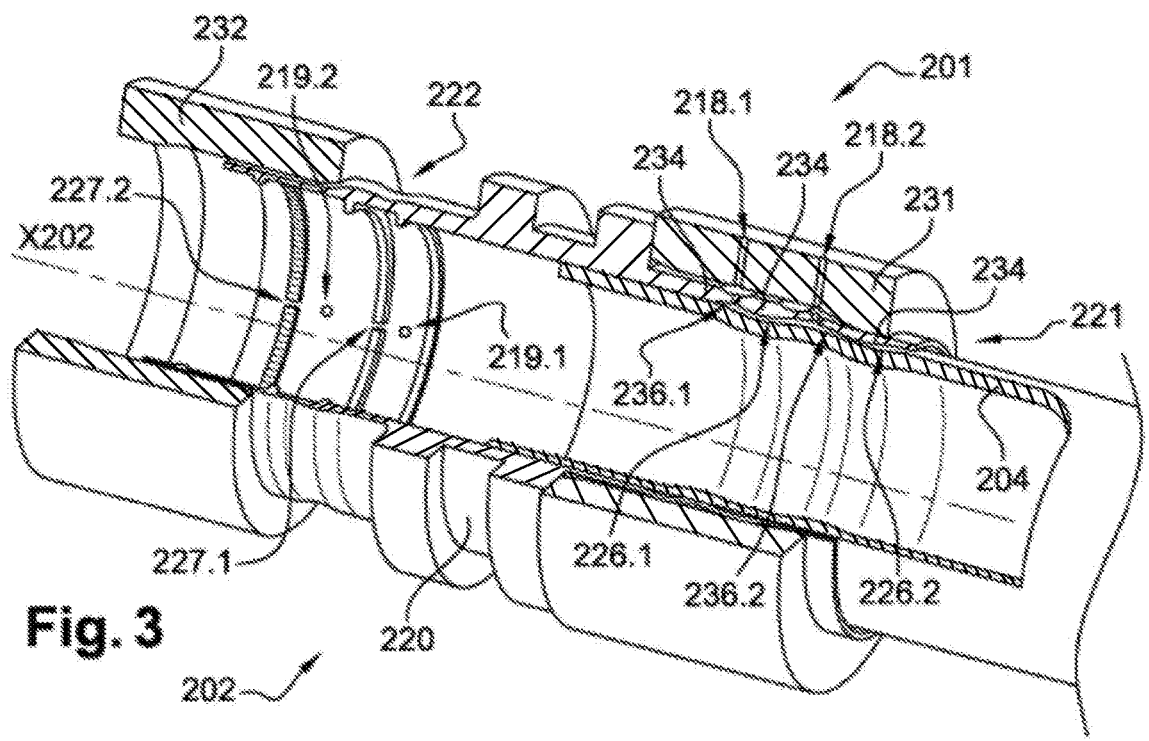
FIG. 3 is a view similar to FIG. 1 illustrating part of a set of pipes according to a third embodiment of the invention and comprising a coupling according to a third embodiment.

FIG. 3 illustrates a set of pipes 201 and a coupling 202 which are in accordance with a third embodiment of the invention. Insofar as the set of pipes 201 and the coupling 202 are similar respectively to the set of pipes 1 and to the coupling 2 and to the set of pipes 101 and to the coupling 102, the description of the set of pipes 1 and of the coupling 2 given hereinabove in relation to FIG. 1 can be read across to the set of pipes 201 and to the coupling 202, with the exception of the notable differences listed hereinafter.

A component of the set of pipes 201 or of the coupling 202 that is identical or corresponds, in terms of its structure or in terms of its function, to a component of the set of pipes 1 or of the coupling 2 bears the same numerical reference increased by 200. There is thus an axial direction X202, a pipe 204, an intermediate body 220, two coupling members 221 and 222, two crimping rings 231 and 232, three ribs 234, grooves 226.1 and 226.2, grooves 227.1 and 227.2, holes 218.1 and 218.2, holes 219.1 and 219.2, and cavities 236.1 and 236.2.

The coupling 202 differs slightly from the coupling 2 because, in addition to the grooves 226.1 and 226.2, 227.1 and 227.2 and equivalent, the exhaust orifices are also formed by holes 218.1 and 218.2, 219.1 and 219.2 and equivalent. In other words, the coupling 202 is a combination of the couplings 2 and 102.

Figure 4:
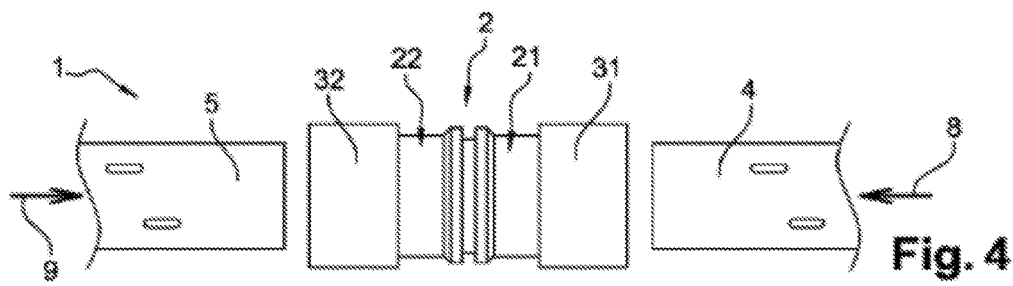
FIG. 4 is a schematic perspective view illustrating an initial step in a method of assembly according to the invention, in which step the set of pipes of FIG. 1 has its coupling in an introduction position.
Figure 5:
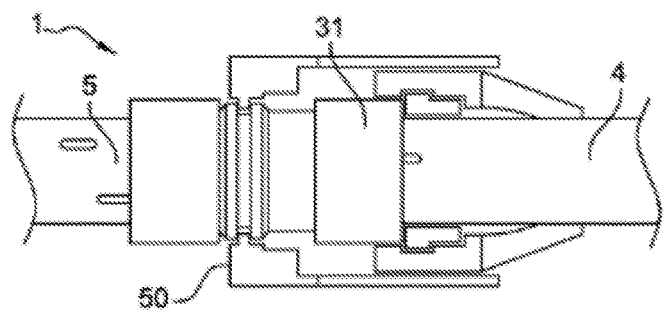
FIG. 5 is a schematic perspective view illustrating an intermediate step of the method of assembly according to the invention, in which step a tool crimps the coupling and the pipes of the set of pipes of FIG. 4.
Figure 6:
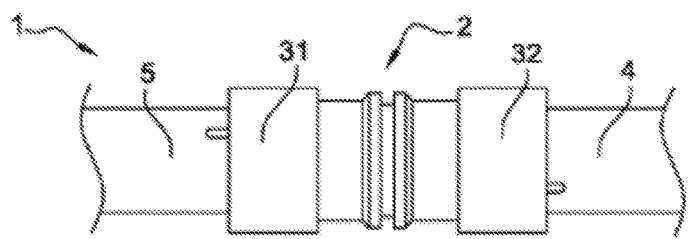
FIG. 6 is a schematic perspective view illustrating a final step of the method of assembly, in which step the coupling of the set of pipes of FIG. 4 is in the crimping position.

FIGS. 4, 5 and 6 respectively illustrate an initial step, an intermediate step, and a final step of a method of assembly according to the invention for constructing the set of pipes 1 of FIG. 1.

The method of assembly allows pipes 4 and 5 to be assembled to the coupling 2. The method of assembly comprises the steps:

of introducing the pipes 4 and 5 respectively into the coupling members 21 and 22, in the directions of the arrows 8 and 9 in FIG. 4, and of moving the crimping rings 31 and 32 from the introduction position (FIG. 4) to the crimping position (FIG. 6) so as to couple the coupling 2 with the pipes 4 and 5 such that the exhaust orifices 26.1 and 26.2 (see FIG. 1) fluidically connect the cavities 34 (see FIG. 1) to the outside 10 of the coupling 2.

In order to perform the step of moving each crimping ring 31 or 32, it is possible to use jaws 50 driven by hydraulic, electric or manual tooling controlled or manipulated by an operator, not depicted. The jaws 50 have the role of crimping the crimping rings 31 and 32 to the coupling 2 by radially deforming the coupling members 21 and 22 and the pipes 4 and 5.

Having performed the method of assembly, the set of pipes 1 comprises two pipes 4 and 5 and the coupling 2 which is coupled to the pipes 4 and 5 in a fluidtight manner by crimping. In the example of FIGS. 1 and 4 to 6, the coupling 2 is made of stainless steel and the pipes 4 and 5 are also made of stainless steel.

Of course, the invention is not restricted to the particular embodiments described and illustrated in the present application. Other alternative forms or embodiments within the reach of a person skilled in the art may also be envisioned without departing from the scope of the invention as defined by the claims hereinafter.

For example, as an alternative to the embodiments described hereinabove, the coupling may comprise a single coupling member designed to receive a pipe, the coupling moreover being configured in such a way as to be fixed to a fluidic component other than a pipe, such as a collector unit or a manifold unit. In this alternative, just one pipe is coupled and crimped to the coupling. Thus, the coupling allows this single pipe to be coupled in a fluidtight manner to the fluidic component.

Of course, the invention is not restricted to the particular embodiments described in the present application. Other embodiments within the reach of a person skilled in the art may also be envisioned without departing from the scope of the invention as described by the claims hereinafter.

According to one alternative form, the coupling may have a curved tubular shape, rather than being rectilinear like the couplings 2, 102 and 202. In that case, the axial direction is defined by a curve, for example a 90 degree elbow. In an alternative form such as this, the movement of each crimping ring is a curved translational movement.

The invention claimed is:

1. A coupling configured to be fluidically coupled to at least one pipe in a cryogenic air separation unit, the coupling comprising:
   at least one coupling member having a tubular overall shape and offering a receptacle to accept the pipe, the said coupling member comprising at least one rib of annular overall shape;
   at least one crimping ring arranged on said at least one coupling member in such a way as to be moved between an introduction position, in which the pipe can be introduced into said at least one receptacle, and a crimping position, in which the crimping ring immobilizes the pipe with respect to a respective coupling member following deformation of said at least one rib; and
   at least one exhaust orifice configured to fluidically connect said at least one cavity to an area outside of the coupling,
   wherein the receptacle and the at least one rib are configured to allow the formation of the at least one cavity between the coupling member and the pipe in the crimping position following deformation of said at least one rib during use.

2. The coupling as claimed in claim 1, in which said at least one exhaust orifice is formed by holes which coincide and which pass respectively through said at least one coupling member and said at least one crimping ring between said at least one cavity and an external surface of said at least one crimping ring.

3. The coupling as claimed in claim 2, in which said holes are rectilinear, said holes extending perpendicular to a direction of flow of a fluid in the corresponding coupling member.

4. The coupling as claimed in claim 1, in which several cavities are formed between the coupling member and the pipe in the crimping position, the coupling having several exhaust orifices arranged in such a way as to respectively fluidically connect at least one of the cavities to the outside of the coupling.

5. The coupling as claimed in claim 1, in which said at least one exhaust orifice is formed by at least one groove arranged in such a way as to either open into a respective cavity or onto a side of the rib which is an opposite side to the respective cavity, the or each groove extending perpendicular to one or several ribs.

6. The coupling as claimed in claim 5, in which the coupling has at least two grooves, the grooves being distributed around the corresponding coupling member.

7. The coupling as claimed in claim 6, wherein the at least two grooves are uniformly distributed around the corresponding coupling member.

8. The coupling as claimed in claim 6, in which the or each coupling member comprises at least two ribs, several cavities being formed near respective ribs, each groove being arranged in such a way as to either open into a respective or onto the side of the respective rib which is the opposite side to the respective cavity, so that the grooves allow fluid to be channeled from at least one cavity referred to as an upstream cavity, which is the one closest to the inside of the coupling and a cavity referred to as a downstream cavity, which is the one closest to the outside of the coupling.

9. The coupling as claimed in claim 1, in which said at least one exhaust orifice has a delivery cross section of between 1 mm$^2$ and 10 mm$^2$.

10. The coupling as claimed in claim 1, in which the receptacle has the overall shape of a cylinder with a circular base.

11. The coupling as claimed in claim 1, further comprising at least one stop member arranged in such a way as to stop a respective crimping ring in the crimping position.

12. The coupling as claimed in claim 1, comprising two coupling members and two crimping rings, the coupling further comprising an intermediate body securing the coupling members together.

13. A method of assembling at least one pipe with a coupling within a cryogenic air separation plant, the method comprising the steps of:
   providing the coupling as claimed in claim 1;
   introducing said at least one pipe into said at least one coupling member; and
   moving said at least one crimping ring from the introduction position to the crimping position so as to couple the coupling to said at least one pipe so that said at least one exhaust orifice fluidically connects said at least one cavity to the outside of the coupling.

* * * * *